United States Patent [19]

Tice et al.

[11] 3,813,593

[45] May 28, 1974

[54] REDUCTION OF TURBINE GENERATOR SHAFT TORQUES

[75] Inventors: James B. Tice; Colin E. J. Bowler, both of Schenectady, N.Y.

[73] Assignee: General Electric Company, Schenectady, N.Y.

[22] Filed: May 4, 1973

[21] Appl. No.: 357,127

[52] U.S. Cl. .................... 321/9 R, 322/58, 322/79, 322/76,
[51] Int. Cl. ......................................... H02m 1/12
[58] Field of Search ............. 321/9, 10; 322/32, 58, 322/78; 333/76, 79

[56] References Cited
UNITED STATES PATENTS

| | | | |
|---|---|---|---|
| 2,008,515 | 7/1935 | Plathner | 321/9 R |
| 2,829,333 | 4/1958 | Turvey | 322/32 |
| 3,012,185 | 12/1961 | Johnson | 322/58 X |
| 3,290,578 | 12/1966 | Ainsworth | 321/9 R |
| 3,295,045 | 12/1966 | Domizi | 321/9 R X |
| 3,395,327 | 7/1968 | Kaiser et al. | 333/76 X |
| 3,535,542 | 10/1970 | Gilsig | 321/9 R X |
| 3,555,291 | 1/1971 | Dewey | 333/76 X |

Primary Examiner—William M. Shoop, Jr.
Attorney, Agent, or Firm—Vale P. Myles

[57] ABSTRACT

The invention discloses a new and improved means for attenuating and modifying sub-synchronous frequencies in a power transmission system through the use of a power filter comprising a plurality of serially connected, mutually coupled, parallel resonant circuits, wherein the individual parallel resonant circuits are tuned. A power filter is inserted serially in one side of each phase of the power transmission system.

8 Claims, 2 Drawing Figures

PATENTED MAY 28 1974 3,813,593

REDUCTION OF TURBINE GENERATOR SHAFT TORQUES

This invention relates to protection apparatus for power generation equipment and, more particularly, to a protection apparatus for attenuating and modifying sub-synchronous frequency oscillatory currents which occur on power transmission lines associated with the power generation equipment.

BACKGROUND OF THE INVENTION

When series capacitors are used in an electric utility transmission system to reduce the reactive component of line impedance, an oscillatory electric circuit is created that has a natural electrical frequency in the sub-synchronous frequency range, generally between 10 and 40 Hz as contrasted to the power generating operating frequency of 60 Hz. Transient currents in the sub-synchronous frequency range interact with the field excitation on the generator rotor of the power generating equipment to produce pulsating air-gap torques at slip frequency, that is, between 20 and 50 Hz. The slip frequency air-gap torques produce rotor oscillations and corresponding torques on the shafts connecting the generator and turbine rotors of the power generating equipment. If the slip frequency torque happens to correspond closely to any of the mechanical torsional natural frequencies of the turbine generator assembly, the resulting rotor motions of the power generating equipment can become appreciable and the corresponding shaft torques that develop can be damaging and, as for example, may cause breakage of the shaft. Furthermore, the generator rotor motion produces a voltage in the armature circuit which reinforces the electrical system natural frequency currents so that they decay more slowly than they would for constant rotor speed. In the limit these coupled mechanical and electrical system oscillations reinforce each other to the point where they become unstable, in which case they will build up spontaneously to damaging levels without any large initiating system disturbance.

It is highly desirable to maintain continuing operation of a power generating system, although such power generating system is subjected to widely varying conditions over a period of time. The varying conditions include fault currents, switching operations, varying loads and varying voltage-current phase relationships. In general, it has been found that long distance power transmission systems and the loads thereon are inductive in nature and it is advantageous to compensate for this by introducing series capacitor compensating means into the power transmission system for the purpose of improving stability or voltage regulation or obtaining the desired current flow division.

It has been proposed that series resistors be added in transmission lines to attenuate electrical system oscillations reflected to the turbine generator assembly. If desired, the resistors could be protected by resonant circuits tuned to keep the power frequency current out of the resistors and placed in parallel with the resistors. However, this approach does not take advantage of the fact that the sensitivity of the turbine-generator connecting means or shaft to torsional oscillations is a function of the resonant frequency of the electrical system and hence the foregoing approach is one of broadband attenuation and requires a bulky and expensive package of protective equipment in order to provide control of shaft torques.

In accordance with the present invention, a circuit is provided utilizing a minimum number of components and without requiring large banks of power resistors or other bulky heat dissipating apparatus, and which circuit provides protection to a turbine-generator assembly against sub-synchronous frequency transient oscillatory currents. Moreover, the circuit of this invention attenuates reflected electrical system sub-synchronous frequency transient oscillatory currents in a ratio which is proportional to the stress which can be caused to the turbine-generator connecting shafts by interaction of such currents with the generator rotor flux.

It is an object of this invention to provide a new and improved apparatus to protect turbine-generator shaft systems from pulsating torques caused by sub-synchronous frequency oscillating currents on a power transmission line associated with the power generating system.

This invention provides a new and improved power filter for use in combination with a power generating system which power filter provides the required attenuation and frequency modification of the sub-synchronous frequency currents entering the turbine-generator portion of said power generating system.

In carrying out the objects of this invention, in one form thereof, an electrial power generating system which includes a turbine driving a generator rotor by means of a shaft system and a protection circuit arrangement therefor, is shown. A delta connected primary of a delta-wye (Δ—Y) transformer is connected to the output of the generator. The Y secondary of the Δ—Y is connected to lines of a power transmission system. A plural section power filter is serially-connected in the power lines of the power transmission system between a low voltage side of each winding and a common neutral in each leg of the Y secondary of the Δ—Y transformer. The filter is tuned such that it offers a minimum impedance to current at the power frequency while presenting an impedance to currents at sub-synchronous frequencies in a ratio proportional to the amount of stress expected to be caused to the turbine-generator connecting shaft by interaction of those sub-synchronous frequency currents with the generator rotor magnetic flux.

DETAILED DESCRIPTION OF THE INVENTION

Figure 1:
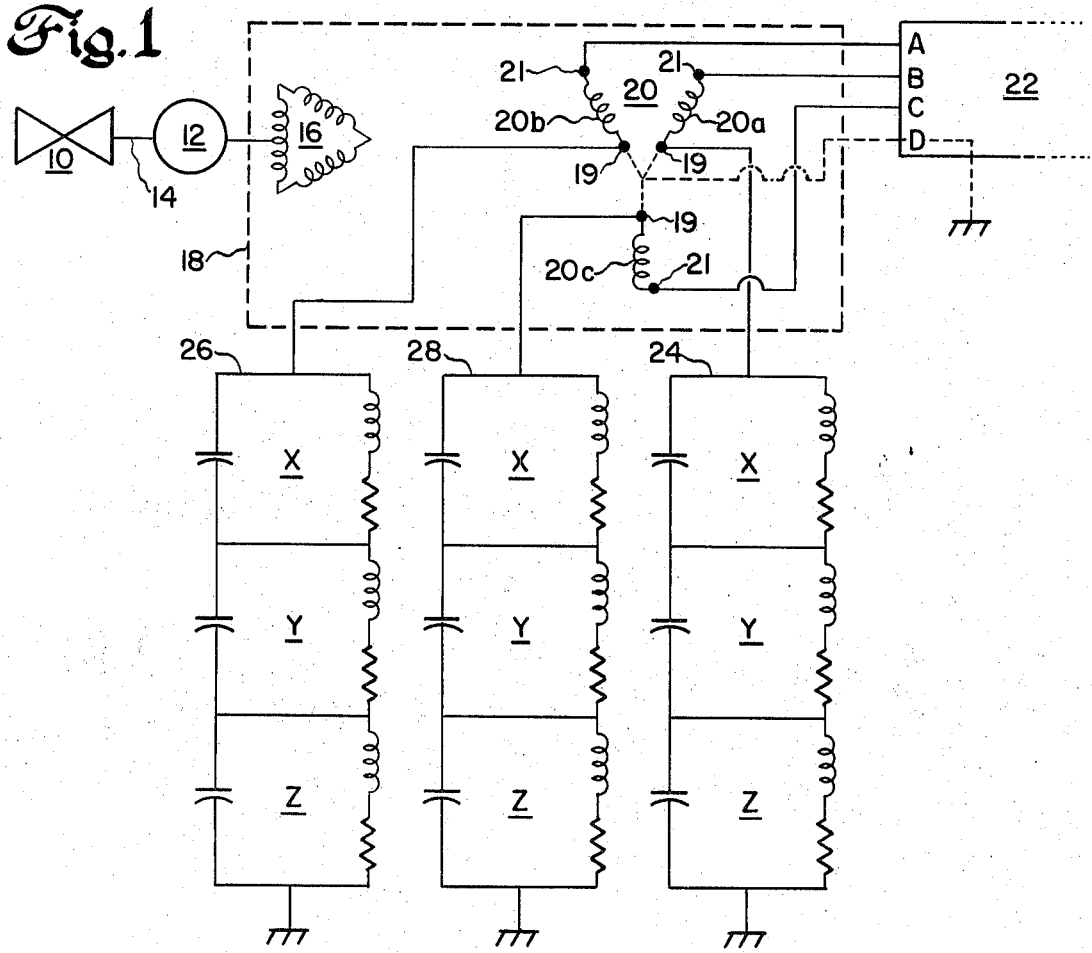
Figure 2:
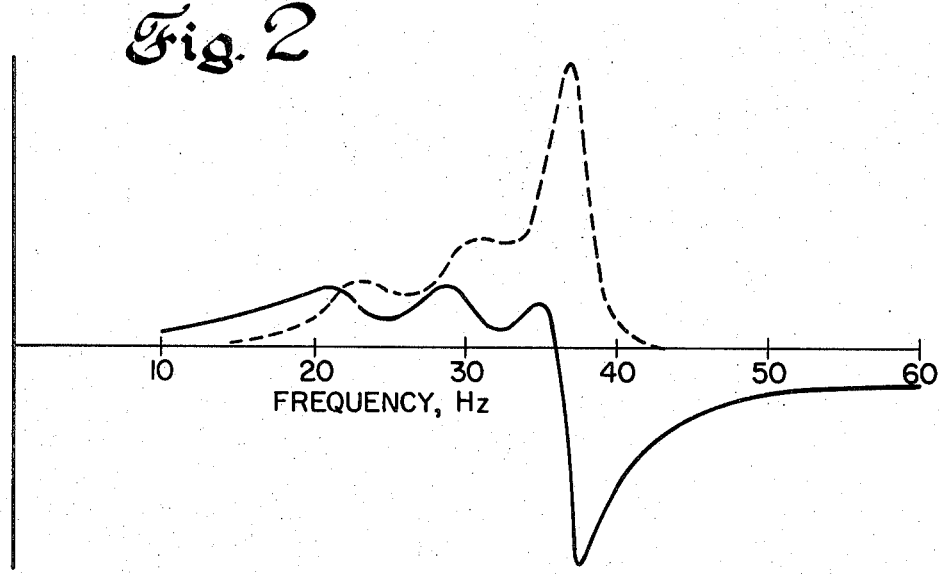

For a better understanding of the invention, reference may be had to the accompanying drawings in which:

FIG. 1 is a simplified schematic diagram of an electrical power generating system embodying the invention, and FIG. 2 is a graph showing the characteristics of a power filter constructed according to the teachings of this invention.

While it is contemplated that the protection circuit of this invention may have other applications, it is particularly useful in connection with electrical power generating equipment and is particularly described below in connection with such use. Moreover, it is described as employing in a three-phase power generating system although its application in other systems having a different number of phases is within the scope of the invention.

Referring specifically to the embodiment of the invention as shown in FIG. 1, the electrical power generating system includes a turbine 10 driving the rotor of a generator 12 by means of a connecting shaft 14. The combination of turbine 10, generator 12, shaft 14, illustratively, but not by way of limitation, represents a simplified hydroelectric generator system or a tandem-compound turbine generating unit of a type in common use today as a source of three-phase power.

In FIG. 1, a transformer 18 is shown for coupling the three-phase power from generator 12 to a four-line transmission system 22. Transformer 18 comprises a delta (Δ) wound primary 16 and a wye (Y) wound secondary 20. The delta wound primary 16 is connected to receive a three-phase output from generator 12. The wye wound secondary includes first, second, and third windings 20A, 20B, and 20C, each winding having a low-voltage terminal 19 and a high voltage terminal 21. The high-voltage terminals 19 of the first, second, and third windings 20A, 20B, and 20C are connected to respective lines in transmission system 22 at points A, B, and C.

In the prior art, the low-voltage terminals 19 of the first, second, and third windings 20A, 20B, and 20C are connected to a common neutral which in turn is connected to a fourth line or more commonly, ground, in the transmission system 22 as indicated by dotted line D. However, series capacitors (not shown) used in the art to reduce reactive components of line impedance in electrical transmission systems provide a source of oscillatory electric current which in turn tends to establish the oscillating sub-synchronous frequency transient currents in the transmission systems. These sub-synchronous frequency transient currents interact with the generator rotor magnetic flux resulting in unwanted pulsing torque on the turbine-generator shaft system.

To attenuate the unwanted sub-synchronous frequency transient currents, the present invention illustratively includes first, second, and third series blocking parallel resonant power filters 24, 26, and 28 connected respectively between the low voltage terminals of windings 20A, 20B, and 20C and the neutral return. In the disclosed embodiment, each filter 24, 26, and 28 comprises a plurality of sections X, Y, and Z. Although the invention is operative with any number of sections in each filter, one embodiment contemplates choosing the number of filter sections relative to the number of mechanical torsional natural frequencies of the generating system with which the invention is to be used, each filter section being turned to attenuate electrical signals at a frequency which causes excitation of a torsional mechanical natural frequency in the turbine-generator shaft system.

Illustratively, and with reference to the filter in a single phase, all phases carrying substantially the same filter arrangement, filter 24 comprises first, second, and third parallel resonant circuits. Although, not shown, it is desirable to have each parallel resonant circuit mutually coupled to the other of said parallel resonant circuits comprising the filter. Each circuit, including mutual coupling effects, is tuned to one of three different selected frequencies. The parameters of the components necessary to provide the desired resonant frequency for the resonant circuit is well known in the art. The selected frequencies are determined by analysis of the characteristics of the turbine-generator shaft system and are coordinated with selected ones of the torsional mechanical natural frequencies of oscillation of the turbine-generator shaft system. Each resonant circuit of the filter is tuned to provide the required impedance and frequency modification of the sub-synchronous frequency electrical oscillatory current which would excite a torsional mechanical natural frequency of oscillation causing excessive stress to the shaft 14 of the turbine-generator shaft system.

In operation, the series blocking power filter effectively modifies and attenuates the sub-synchronous oscillatory currents in transmission system 22. In addition, as is well known in the art, the frequency modifying effect of the parallel resonant circuits of filter 24 cause the frequency of oscillatory current in transmission system 22 to shift in frequency away from those frequencies causing maximum stress on turbine-generator rotor 14.

Referring specifically to FIG. 2, there is shown a graph of the characteristics of an illustrative filter constructed in accordance with the teaching of the present invention. As is shown, the filter presents a minimum impedance to the power frequency current and a coordinated impedance to those frequencies which excite the turbine-generator shaft system's mechanical natural frequencies of oscillation. The dotted line represents the resistive characteristics of a single unit and the solid line represents the reactive characteristics of a single unit.

This invention has been described in connection with a turbine-generator system where it has particular applicability and its operation has been set forth with relation to such use. It will be understood, however, that the parallel resonant power filter disclosed may be used in other environments, as in a single phase or other multi-phase systems, where high power sub-synchronous frequency currents may cause substantial harm if not attenuated and it is necessary to dissipate these currents without exceeding the rating of any component of the apparatus used in these environments and causing damage thereto. It is intended, therefore, that the appended claims not be limited to the specific embodiment of the invention described, but that they cover modifications falling within the spirit and scope of the claims.

What is claimed is:

1. A protection filter system for power generating equipment to be connected to a power line transmission system wherein the power generating equipment has inherent sub-synchronous natural resonant frequencies, said protective filter system comprising:
a plurality of serially connected, mutually coupled, electrical resonant circuits, each of said electrical resonant circuits being tuned to a different one of said inherent sub-synchronous natural resonant frequencies, and means for inserting said protective filter in series with a power line of said transmission system.

2. An electric power generating and power transmission system including at least one phase and wherein said power generating portion of said system has inherent sub-synchronous natural resonant frequencies and said power transmission portion of said system has sub-synchronous frequencies developed thereon, a protection filter system connected in series with a line of each phase of said power transmission system, said protective filter system comprising a plurality of serially connected, electrical resonant circuits, each of said electrical resonant circuits being tuned to a different one of said inherent sub-synchronous natural resonant frequencies.

3. The power generation and power transmission system and protective filter system therefor as defined in claim 2 and wherein said serially connected, electrical resonant circuits are mutually coupled to one another.

4. The power generation and power transmission system and protective filter system therefor as defined in claim 2 and wherein there are N inherent sub-synchronous natural resonant frequencies, each protective filter system comprises N sections and each of said electrical resonant circuits is tuned to a different frequency but corresponding to one of said N inherent sub-synchronous frequencies.

5. The power generation and power transmission system and protective filter system therefor as defined in claim 3 and wherein there are N inherent sub-synchronous natural resonant frequencies, each protective filter system comprises N sections and each of said electrical resonant circuits is tuned to a different frequency but corresponding to one of said N inherent sub-synchronous frequencies.

6. An electric power generating and power transmission system wherein said power generating portion of said system developes power in a multi-phase mode and said power generating portion of said system has inherent sub-synchronous natural resonant frequencies, and said power transmission portion of said system is a multi-phase mode transmission system wherein sub-synchronous frequencies may be developed, and a protective filter system connected in series with a line of each phase of said power transmission system, said protective filter system comprising a plurality of serially connected, mutually coupled, electrical resonant circuits, each of said electrical resonant circuits being tuned to a different one of said inherent sub-synchronous natural resonant frequencies.

7. An electric power generating and power transmission system and a protective filter system therefor, as defined in claim 6 and wherein said multi-phase mode of said power generating portion of said system and said multi-phase transmission system are both three phase.

8. An electric power generating and power transmission system and a protective filter system therefor, as defined in claim 7 and wherein said multi-phase transmission system is in a wye mode having a common point and wherein said protective filter system connected in series with a line of each phase of said power transmission system is also connected to the common point of said wye mode.

* * * * *

UNITED STATES PATENT OFFICE
CERTIFICATE OF CORRECTION

PATENT NO. : 3,813,593

DATED : May 28, 1974

INVENTOR(S) : James B. Tice and Colin E. J. Bowler

It is certified that error appears in the above-identified patent and that said Letters Patent are hereby corrected as shown below:

Column 4, line 49, insert "mechanical" between "natural" and "resonant"

Column 4, line 52, delete "each" and substitute -- the combination --

Column 4, line 53, delete "a different one" and substitute -- protect all --

Column 4, line 54, insert "mechanical" between "natural" and "resonant"

Column 4, line 61, insert "mechanical" between "natural" and "resonant"

Column 4, line 63, insert "electrical" between "synchronous" and "frequenci

Column 4, line 67, delete "each" and substitute -- the combination --

Column 5, line 1, delete "a different one" and substitute -- protect all -

Column 5, line 12, insert "mechanical" between "natural" and "resonant"

Column 5, line 13, delete "N" and substitute -- multiple --

Column 5, line 15, insert "protect" between "to" and "one"

Column 5, line 15, insert "or more" between "one" and "of"

Column 5, line 16, insert "natural mechanical resonant" between "sub-synchronous" and "frequencies."

Column 5, line 20, insert "mechanical" between "natural" and "resonant"

Column 5, line 21, delete "N" and substitute -- multiple --

Column 5, line 23, insert "protect" between "to" and "one"

UNITED STATES PATENT OFFICE
CERTIFICATE OF CORRECTION

PATENT NO. : 3,813,593

DATED : May 28, 1974

INVENTOR(S) : James B. Tice and Colin E. J. Bowler

It is certified that error appears in the above-identified patent and that said Letters Patent are hereby corrected as shown below:

Column 5, line 23, insert "or more" between "one" and "of"

Column 5, line 24, insert "natural mechanical resonant" betwee "sub-synchronous" and "frequencies."

Column 6, line 2, insert "mechanical" between "natural" and "resonant"

Column 6, line 10, delete "each" and substitute -- the combination --

Column 6, line 11, delete "a different one" and substitute -- protect all --

Column 6, line 12, insert "mechanical" between "natural" and "resonant"

Signed and Sealed this thirtieth Day of March 1976

[SEAL]

Attest:

RUTH C. MASON
Attesting Officer

C. MARSHALL DANN
Commissioner of Patents and Trademarks